United States Patent
Shimada

(10) Patent No.: US 6,684,028 B2
(45) Date of Patent: Jan. 27, 2004

(54) CAMERA APPARATUS, CONTROL METHOD THEREOF AND PROGRAM

(75) Inventor: Yoshinao Shimada, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/335,232

(22) Filed: Dec. 30, 2002

(65) Prior Publication Data

US 2003/0156833 A1 Aug. 21, 2003

(30) Foreign Application Priority Data

Jan. 8, 2002 (JP) ........................................ 2002-001381

(51) Int. Cl.$^7$ ............................................... G03B 15/05
(52) U.S. Cl. ........................ 396/157; 396/161; 348/363; 348/371
(58) Field of Search ................................. 396/159, 157, 396/161, 170; 348/370, 371, 363

(56) References Cited

U.S. PATENT DOCUMENTS 6,154,612 A * 11/2000 Iwasaki ........................ 396/61
6,546,203 B2 * 4/2003 Hofer ........................ 396/155

FOREIGN PATENT DOCUMENTS

JP 11-298793 A 10/1999
JP 2000-162679 A 6/2000

* cited by examiner

Primary Examiner—W. B. Perkey
(74) Attorney, Agent, or Firm—Frishauf, Holtz, Goodman & Chick, P.C.

(57) ABSTRACT

A camera apparatus, which performs a preliminary light emission before a main light emission for a photograph, comprising a photoelectric conversion part which output a photoelectric conversion data which corresponds to an incident luminous flux through a photograph lens, a preliminary light emission part which performs at least twice preliminary light emission of a first light emission which corresponds to the normal photographic region and a second preliminary light emission which corresponds to a close-up shot, a data acquisition part which acquires a photoelectric conversion data corresponding to the first preliminary light emission and the second preliminary light emission, respectively, a judgment part which judges whether it is a close-up shot or not based on the data obtained by the data acquisition part, and a setting part which sets a light emission condition of the main light emission based on a judgment result of the judgment part.

12 Claims, 5 Drawing Sheets

CAMERA APPARATUS, CONTROL METHOD THEREOF AND PROGRAM

CROSS-REFERENCE TO RELATED APPLICATIONS

This application is based upon and claims the benefit of priority from the prior Japanese Patent Application No. 2002-001381, filed Jan. 8, 2002, the entire contents of which are incorporated herein by reference.

BACKGROUND OF THE INVENTION

1. Field of the Invention

The present invention generally relates to a camera apparatus such as digital cameras, which can photograph with a flash device, and especially to a flash device control technique at a close-up shot.

2. Description of the Related Art

Conventionally, in the digital camera, there is a camera apparatus, with which a flash device to illuminate flash light to a subject at a photograph is included as standard equipment.

By the way, there is a camera to which the photograph mode of the close-up shot etc. (hereafter, it is expressed as "close-up shot" mode) is prepared in the digital camera. The close-up shot mode is a mode for executing the photograph (close-up) whose photograph distance to subject is the short distance within 60 cm for instance. The photograph modes are switched by switching a processing mode changing switch in the camera apparatus which has such a close-up shot mode (referring to Japanese Patent Application KOKAI Publication No. 11-298793).

At such the particular close-up shot, there is a case to want to execute the flash photography in which the flash device illuminates light from the flash device to the subject. The flash device control (flash amount control) to adjust the emission amount of the flash device is necessary in the flash photography, but there is a controllable minimum emission amount (minimum Guide Number) from the restriction on the light amount control accuracy. Therefore, the shortest distance at the flash photography is decided by the diaphragm stop and the ISO sensitivity (usually, ISO100 is set to be a standard), which is the photograph exposure condition.

The method of setting the close-up shot mode might be adopted by operating a macro button when the close-up shot is performed as mentioned above. In this case, to flash in a light emission region where the flash device stably flashes, the diaphragm stop is controlled at narrow side and the flash device is flashed.

In this method, the user must judge whether setting the close-up shot mode is necessary or not according to the photographic distance. It is general that the range of the distance of the close-up shot corresponding to the close-up shot mode is different according to the design specification of the camera apparatus. Therefore, it is not so easy to judge the setting of the close-up shot mode.

In the close-up shot region, an accurate control of the emission amount is required. The influence of the errors included with the accuracy of the distance measurement data and the mechanical inconsistency when the diaphragm is set cannot be ignored.

In addition, it is necessary to narrow the diaphragm to obtain the proper exposure in the close-up shot region, since the emission amount is too large in a state of opening the diaphragm.

A technology, which performs two or more preliminary light emission, to set the emission amount in the main light emission to an optimal emission amount at the flash light emission, is disclosed (referring to Japanese Patent Application KOKAI Publication No. 2000-162679). Since this technology controls gradually changing the emission amount at the preliminary light emission, the main light emission frequency is different according to the photographic situation. Therefore, the frequency of the preliminary light emission does not necessarily become the appropriate (minimum) frequency. Therefore, the time lag for the shutter operation is different according to the photographic situation.

BRIEF SUMMARY OF THE INVENTION

An object of the present invention is to provide a technology concerning a camera apparatus, which achieves the flash device control, which adjusts automatically without requiring setting the close-up shot mode at the close-up shot.

The present invention relates to a camera apparatus, which automatically executes a flash device control (flash amount control) adaptable to the close-up shot, and the control technology thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
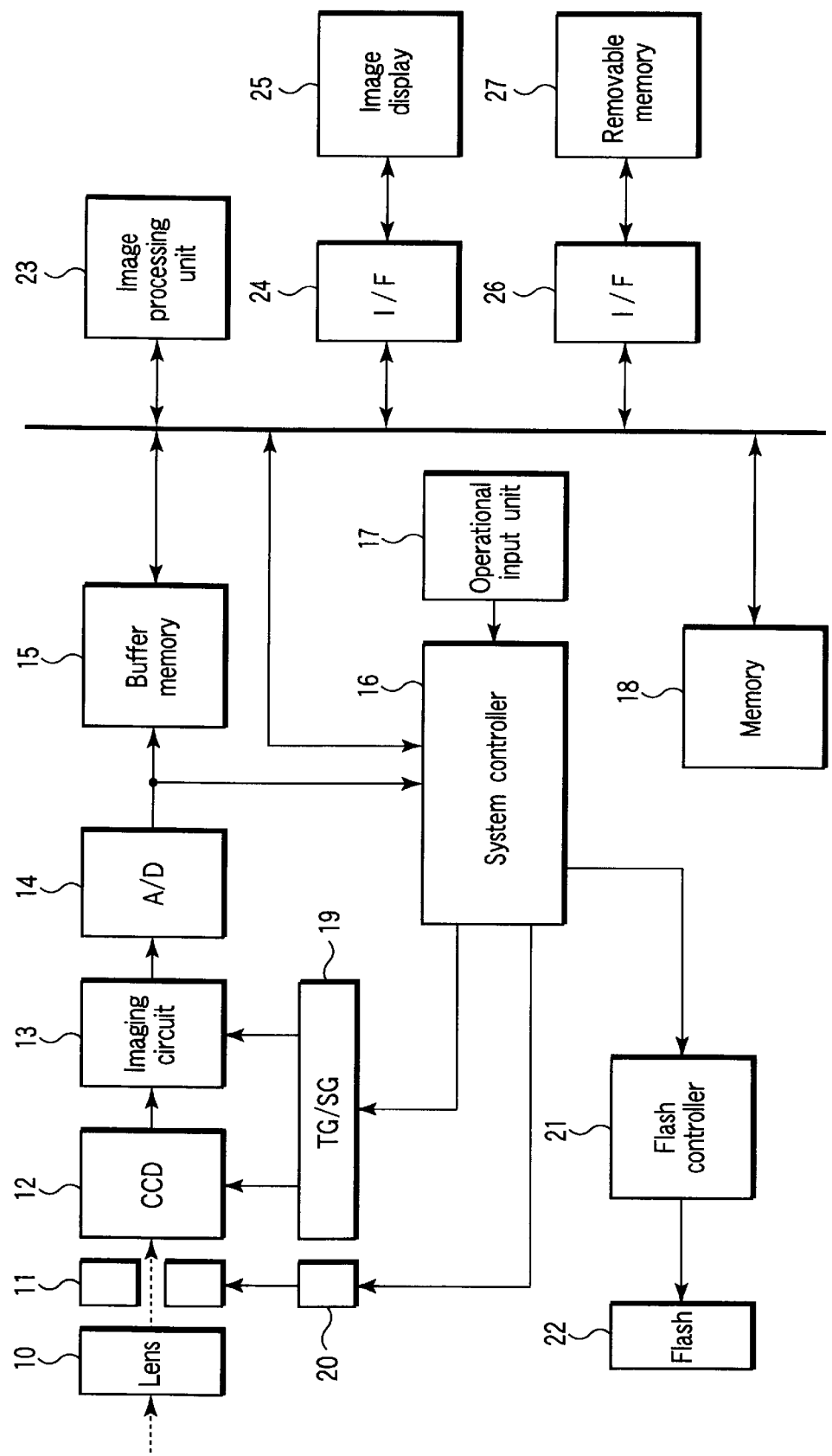
FIG. 1 is a block diagram which shows a main part of the digital camera according to the embodiment of the present invention.

Hereafter, the embodiment of the present invention will be explained referring to the drawings.

(Configuration of the Digital Camera)

FIG. 1 is a block diagram which shows a main part of the digital camera according to the embodiment of the present invention.

The digital camera according to the embodiment of the present invention has a photograph lens 10, a diaphragm 11, a CCD (charge coupled device) 12 as an imaging element, an imaging circuit 13, and an A/D converter 14 as shown in FIG. 1. The photograph lens 10 includes a zoom lens and a focus lens. The diaphragm 11 adjusts the aperture (emission amount which transmits the photograph lens 10) under the control of the system controller 16 through the diaphragm controller 20. The CCD 12 performs photoelectric conversion of a emission amount including the reflected light from the subject and generates the image signal. The imaging circuit 13 inputs the image signal from the CCD 12 and carries out the signal processing of the CDS (correlating double sampling) processing and the AGC (automatic gain control) processing etc. The A/D converter 14 converts the image signal obtained from the imaging circuit 13 into the digital signal (image data).

In addition, the digital camera has a buffer memory 15 which stores an image data temporarily, a system controller 16, an operation input part 17, and a memory 18. The digital camera comprises an image processing part 23 which performs various image processings, a removable memory 27 which contains a record medium such as a memory card which stores an image data through an I/F 26 after various image processings, and an image display 25 comprising, for instance, an LCD monitor which displays an imaged image etc. through the I/F 24.

The system controller 16 executes various control processings including a flash device control concerning the embodiment of the present invention by functioning a microprocessor (CPU), which operates by the control program stored in the memory 18, as a main element. The system controller 16 controls the CCD 12 and the imaging circuit 13 in addition to the above-mentioned diaphragm 11 by a TG/SG circuit 19 which generates a timing/control signal. The memory 18 includes an IC memory group which contains a flash device ROM, EEPROM, RAM and ROM and stores a control information necessary for the various control processings including the flash device control concerning the embodiment of the present invention. The operation input part 17 has a release button, a selection cross key, a mode (reproduction, photograph, and off power, etc.) setting dial, an OK switch, and an ON/OFF switch of the flash device 22, etc. In addition, the system controller 16 executes the main light emission control of the flash device 22 (light amount control) through the flash device controller 21. Especially, as described later, the system controller 16 automatically executes light amount control of the flash device 22 at the close-up shot and controls a main light emission which adjusts to the photograph distance in the close-up shot. The flash device 22 has a light emission part which consists of the light source such as a xenon electrical discharge tube and a Fresnel lens.

(Flash Device Control Operation at Close-Up Shot)

Hereinafter, the flash device control operation at the close-up shot will be explained referring to the timing chart of FIG. 2 and the flowchart of FIG. 3A to FIG. 3C.

Figure 2:
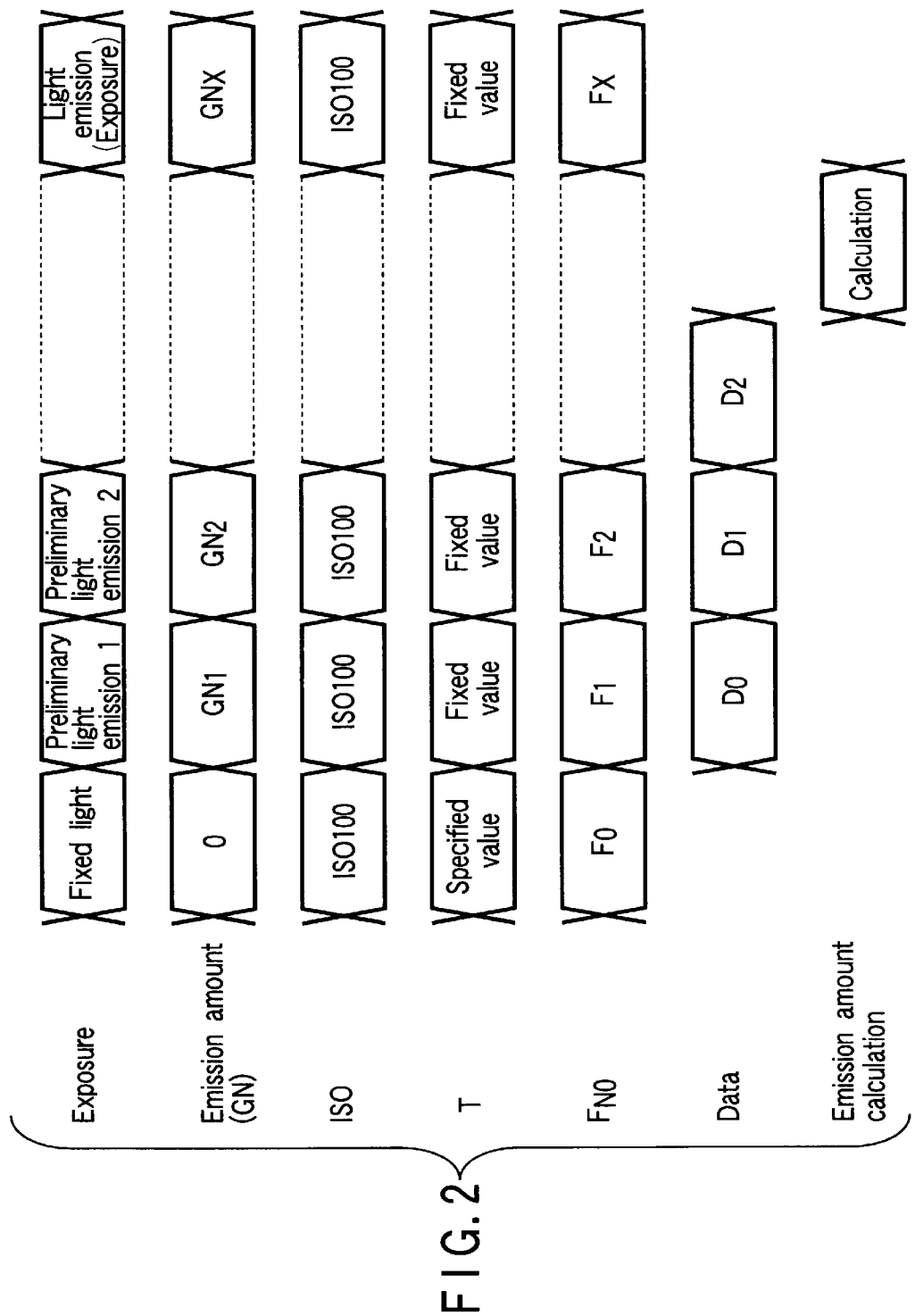
FIG. 2 is a timing chart concerning the embodiment of the present invention.

First of all, in the digital camera, as shown in FIG. 2, the system controller 16 executes an AE (automatic exposure) processing and an AF (automatic focus) processing according to a power supply in the operation input part 17 and the first stage an operation (SW1) of release button (steps S1, S3, and S4). Here, the system controller 16 executes the preparation of a charge etc. necessary for emission of the flash device 22 (step S2). And, the system controller 16 executes the sequence of the flash device control described later according to the second stage operation (SW2) of release button (step S5).

In the embodiment of the present invention, the flash device control at the close-up shot is assumed. As shown in FIG. 2, the sequence of the corresponding flash device control has a ambient light exposure and the first stage preliminary light emission exposure (hereinafter, described as a "preliminary light emission 1"), the second stage preliminary light emission exposure (hereinafter, described as a "preliminary light emission 2"), and an exposure by the main light emission as an exposure operation. A ambient light exposure is the emission amount in a case that emission amount of the flash device 22 (indicated as a guide number GN) is zero. On the other hand, the preliminary light emission 1 and the preliminary light emission 2, and the main light emission are cases that the flash device 22 illuminates light emission by emission amount of "$GN_1$", "$GN_2$", and "$GN_x$", respectively. The guide numbers $GN_1$ and $GN_2$ in the preliminary light emissions 1 and 2 are one example and are selected as the optimal value for the camera system.

Here, as a photograph exposure condition, it is assumed the case where "ISO100" whose ISO sensitivity is sensitivity in the standard is set as the ISO sensitivity, and a specified value or a fixed value (for instance, $1/1024$ seconds) is set as the shutter speed (T). As mentioned above, it becomes hard to be influenced by the regular light by setting the shutter to the high-speed. The diaphragm stop ($F_{NO}$) is relatively set on the open side ($F_{NO}$ is a small value) in the ambient light exposure and the preliminary light emission 1. The diaphragm stop ($F_{NO}$) is set on a closed side ($F_{NO}$ is a large value) in the preliminary light emission 2. In the embodiment, the ambient light exposure and the preliminary light emission 1 are light emission in full aperture (That is, $F_0=F_1$ in FIG. 2). The preliminary light emission 2 is light emission in minimum aperture (That is, $F2>F_1$ in FIG. 2). With this setting, extra set time is not spent in the setting of the diaphragm.

Figure 4:
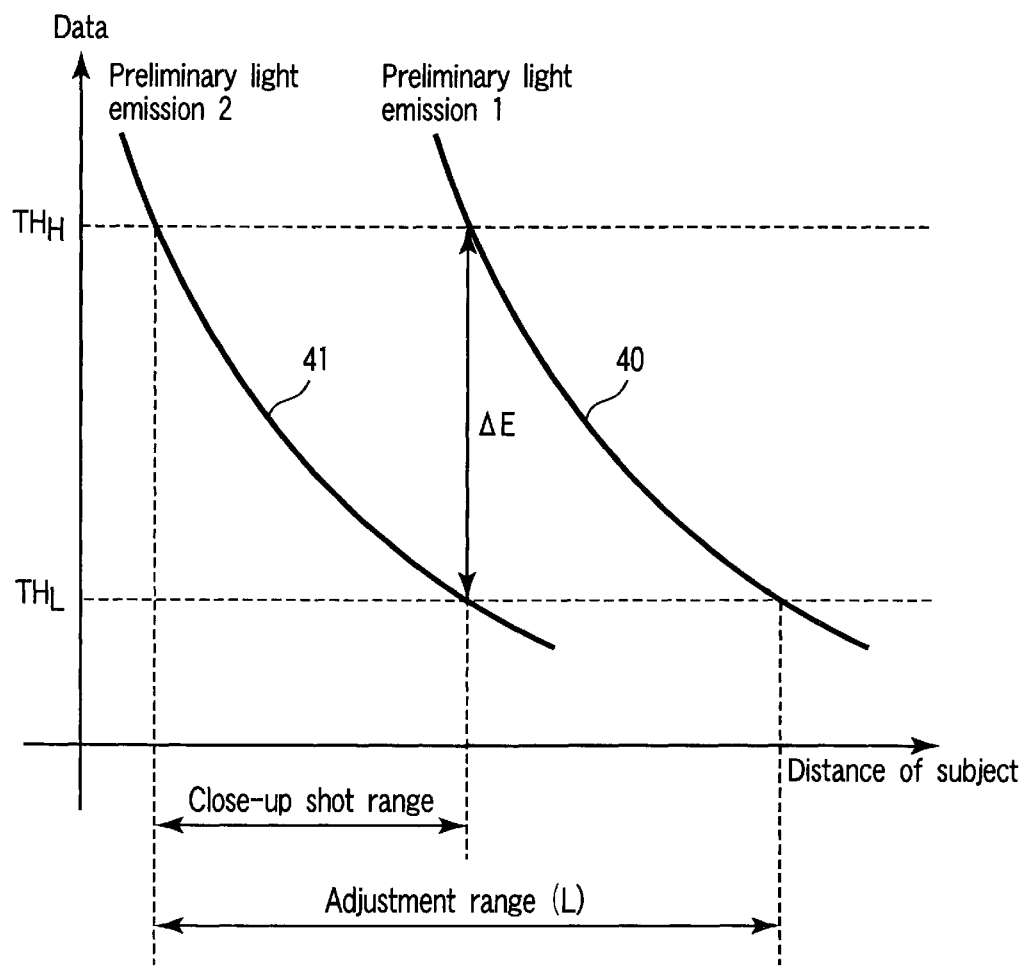
FIG. 4 is a figure which shows characteristic of the preliminary light emission 1 and the preliminary light emission 2 according to the embodiment of the present invention.

The amount of each light emission of the preliminary light emission 1 and the preliminary light emission 2 is set to cover necessary light amount control region (L) of the flash device 22 by the dynamic range ($\Delta E$) of twice preliminary light emission as shown in FIG. 4. Reference numeral 40 shows the output characteristic according to the imaging circuit in the preliminary light emission 1 (full aperture) in FIG. 4, and reference numeral 41 shows the output characteristic according to the imaging circuit in the preliminary light emission 2 (minimum aperture). In the embodiment, the emission amount and the diaphragm are set to be suitable for detecting the output by the preliminary light emission 2 in the close-up shot region. That is, the emission amount and the diaphragm are set to obtain an output which can be accurately judged from the output of the preliminary light emission 2 whether it is a close-up shot region or not. As a result, it becomes possible to calculate accurately the emission amount of the main light emission in the close-up shot region.

The ISO sensitivity, the shutter speed (T), and the diaphragm stop ($F_{NO}$) assumed to be a photograph exposure condition are one example, and are selected as the optimal values for the camera system. It is unnecessary that the diaphragm stop of the exposure by regular light is not the same as that of the preliminary light emission 1, but if they are the same, the operation becomes easy.

Figure 3A:
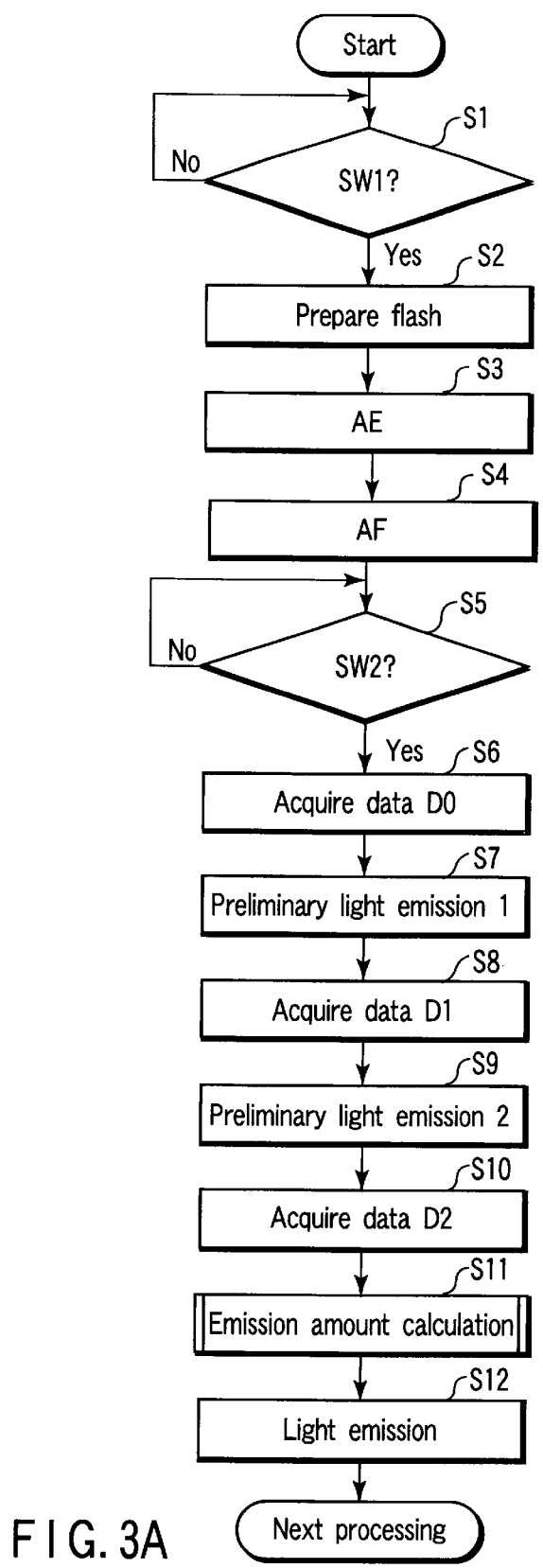
FIG. 3A to FIG. 3C are flowcharts according to the embodiment of the present invention.

The system controller 16 acquires an output data of the A/D converter 14 (assumed to be $D_0$) in the ambient light exposure before the preliminary light emission 1 is started, and stores it in the memory 18 temporarily as the data for the flash device control as shown in FIG. 2 and FIG. 3A (step S6). This data $D_0$ is a digital value of the image signal obtained by photoelectric conversion of the light amount including the reflected light from subject by the CCD 12.

In addition, the system controller 16 acquires the output data of the A/D converter 14 (assumed to be $D_1$) in the preliminary light emission 1 and stores it in the memory 18 temporarily as the data for the flash device control (step S7 and step S8). The system controller 16 acquires the output data of the A/D converter 14 (assumed to be $D_2$) in the preliminary light emission 2 after the preliminary light emission 1 and stores it in the memory 18 temporarily as the data for the flash device control (step S9 and S10).

Next, the system controller 16 executes the operation processing to calculate the amount ($GN_x$) of the light emission necessary for the main light emission by using the output data $D_0$, $D_1$, and $D_2$ corresponding to acquired ambient light exposure, preliminary light emission 1, and preliminary light emission 2, respectively (step S11).

The system controller 16 controls the flash device controller 21 according to the calculated amount ($GN_x$) of the light emission and the flashes from the flash device 22 (step S12).

(Decision Processing of Emission Amount $GN_x$ of Main Light Emission)

The main light emission operation in step S11 of FIG. 3A will be executed as follows.

The system controller 16 executes the following operation (assumed to be operational expression (B)) which uses the data $D_1$ acquired by the preliminary light emission 1 which is the light emission in full aperture and the following operation (assumed to be operational expression (A)) which uses the data $D_2$ acquired by the preliminary light emission 2 which is the light emission in minimum aperture, respectively, as the operation processing of the emission amount.

Figure 3B:
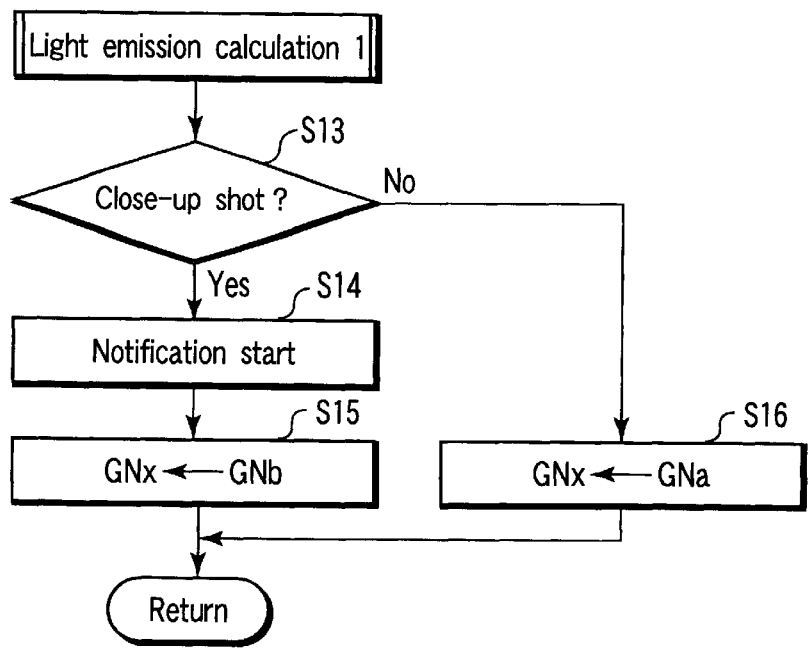
Figure 3C:
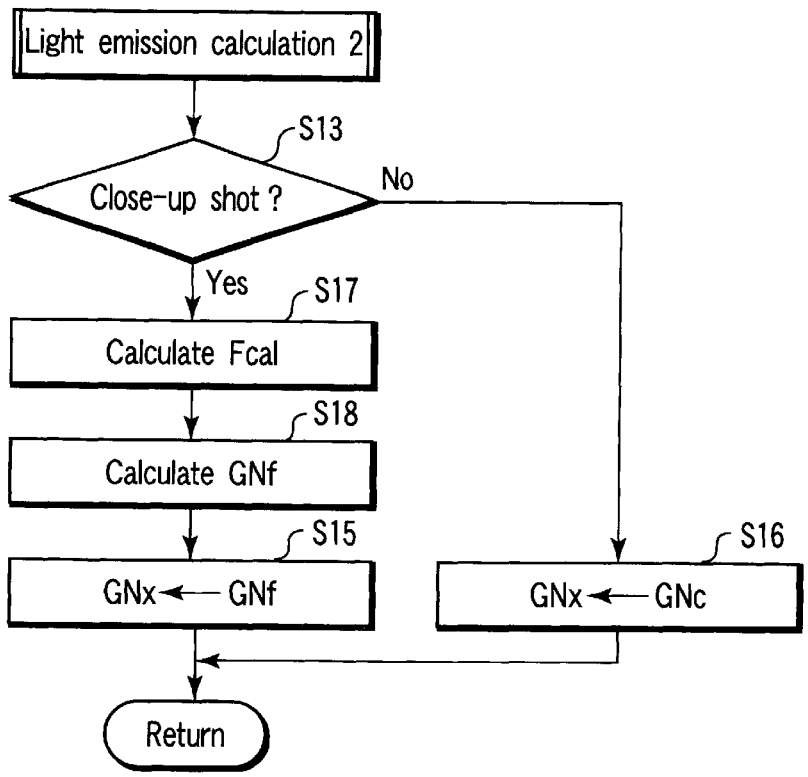

First, the system controller 16 judges whether it is a close-up shot from the acquired data as shown in FIG. 3B (step S13). The system controller 16 starts the notification of the effect of the close-up shot when being judged that it is a close-up shot in step S13 (step S14). The system controller 16 uses the emission amount (assumed to be GNb) calculated by the following operational expression (B) which uses the data $D_2$ corresponding to the light emission in minimum aperture (preliminary light emission 2) for the close-up shot as the emission amount $GN_x$ of the main light emission (step S15). On the other hand, the emission amount (assumed to be GNa) calculated by the following operational expression (A) which uses the data $D_1$ corresponding to light emission in full aperture (preliminary light emission 1) is used as the emission amount $GN_x$ of the main light emission in case of the normal photograph (step S16). The main light emission operation processing ends, and the main light emission is executed (step S12).

Here, the following equations (1) and (2) are expressed as a relational expression to judge the close-up shot by the relation shown in FIG. 2 and FIG. 4.

$$D_1 = D_2 \times (F_1/F_2) - 2 \quad (1)$$

$$D_1 > D_2 \quad (2)$$

Here, $F_1$ indicates the diaphragm stop in the preliminary light emission 1 (open side), and $F_2$ indicates the diaphragm stop in preliminary light emission 2 (closed side). The data within the range in dynamic range $\Delta E$ which can secure the flash light amount measurement accuracy, that is, within lower bound threshold $TH_L$ and upper bound threshold $TH_H$, is selected. The diaphragm stop can be determined based on the selected data. The system controller 16 judges it is the close-up shot when "$D_2 \geq TH_L$" from the expressions (1) and (2) and uses the emission amount (assumed to be GNb) calculated by the following operational expression (B) which uses the data $D_2$ as the emission amount $GN_x$ of the main light emission (step S12). On the other hand, the system controller 16 judges is a normal photograph when "$D_2 < TH_L$" and uses the emission amount (assumed to be GNa) calculated by the following operational expression (A) which uses the data $D_1$ is used as the emission amount $GN_x$ of the main light emission (step S13).

Here, operational expressions (A) and (B) can be developed as follows from the relation shown in FIG. 2 and FIG. 4.

$$GNa = [(Dt - D_0 \times (F_1/F_0)^{-2})/(D_1 - D_0 \times (SS_1/SS_0) \times (F_1/F_0)^{-2})]^{1/2} \times GN \quad (A)$$

Dt indicates the target value of the emission amount, $F_0$ indicates the diaphragm stop at the regular light, the shutter speed in the preliminary light emission 1 is assumed to be $SS_1$, and the shutter speed in the ambient light exposure is assumed to be $SS_0$. The shutter speed (SS) and sensitivity (ISO) are assumed to be the same at the regular exposure and the main light emission.

On the other hand, $$GNb = [(Dt - D_0 \times (F_2/F_0)^{-2})/(D_2 - D_0 \times (SS_2/SS_0) \times (F_2/F_0)^{-2})]^{1/2} \times GN \quad (B)$$

Here, the shutter speed in the preliminary light emission 2 is assumed to be $SS_2$.

As mentioned above, in case of the flash device control method of the embodiment of the present invention, the light emission in full aperture which is the preliminary light emission 1 in the first stage and light emission in minimum aperture which is the preliminary light emission 2 in the second stage are executed. It is judged whether it is the close-up shot from the acquisition data according to each preliminary light emission. And, when being judged that it is the close-up shot, the system controller 16 uses the emission amount (GNb) calculated from the operational expression (B) which uses photoelectric conversion data $D_2$ by the light emission in minimum aperture which is the preliminary light emission 2 as the emission amount ($GN_x$) of the main light emission. At this time, $F_1$ or $F_2$ is used as the diaphragm stop (Fx) of the main light emission according to the used operational expression.

As mentioned above, the system controller 16 shifts automatically to the close-up shot mode at the close-up shot (corresponding to the notification or setting) and executes the main light emission of the flash device 22 using the emission amount optimal to the close-up shot. Therefore, the flash device control (light amount control) which lowering the diaphragm stop optimal to the close-up shot without requiring a set operation of the close-up shot mode by the user even at the close-up shot can be executed.

Though twice preliminary light emission of the preliminary light emission 1 in the first stage and the preliminary light emission 2 in the second stage light emission are assumed as the preliminary light emission of the flash device 22 in the embodiment of the present invention. It is not limited to this, three times or more light emission may be performed with different diaphragm stops. That is, a plurality of the preliminary light emission, which correspond to the preliminary light emission 2 assumed to be set by which the close-up shot region is detected, may be performed by different settings. The plurality of the preliminary light emission, which correspond to the preliminary light emission 1 which corresponds to the normal photographic region, may be performed by different settings. The consumption of the main light emission energy increases according to the increase of the number of the preliminary light emission, too.

By increasing the number of the preliminary light emission as mentioned-above, the present invention may be applied to a case that it is necessary to correspond to the broader dynamic range.

Though, in the above-mentioned embodiment, it is judged by the comparison with lower bound threshold $TH_L$ as a judgment of the close-up shot, it is not limited to this, and the upper bound threshold $TH_H$ may be used.

(Modification)

As mentioned above, though it becomes possible to judge whether it is the close-up shot or not from the obtained data by the preliminary light emission in diaphragm stop ($F_2$) set by the preliminary light emission 2, on the other hand, the background darkens because of narrowing the diaphragm.

Referring to FIG. 3B, as a modification of the above-mentioned embodiment when performing the close-up shot corresponding to this, the control example which sets the diaphragm stop on the open side as much as possible at the main light emission in a case of being judged it is the close-up shot will be explained. The flash device control sequence in this case can be explained similar to FIG. 2.

The decision processing of the main emission amount $GN_x$ is different from the embodiment in this modification, and the method of calculating set value Fx of the diaphragm is newly required.

(Decision of the Light Emission the Emission Amount $GN_x$ and Decision Processing of Diaphragm Stop Fx)

The system controller 16 judges whether it is the close-up shot or not from the data $D_1$ and $D_2$ as well as the above-mentioned embodiment (step S13). Here, the diaphragm stops $F_A$, $F_B$, $F_C$, $F_D$, and $F_E$ exist between the diaphragm stop $F_1$ and the diaphragm stop $F_2$ with the relation shown in expression (3). The system controller 16 sets the diaphragm stop of the diaphragm 11 to the diaphragm controller 20 in either one of the diaphragm stop of the step shown, for instance, by the expression (3). It is assumed that the relation between the expression (4) and the expression (5) are satisfied in each acquisition data.

$$F_1 = F_A \times 2^{(-1/6)} = F_B \times 2^{(-2/6)}$$

$$= F_C \times 2^{(-3/6)} = F_D \times 2^{(-4/6)}$$

$$= F_E \times 2^{(-5/6)} = F_2 \times 2^{(-6/6)} \quad (3)$$

$$D_1 = D_2 \times (F_1/F_2)^{-2} \quad (4)$$

$$D_1 > D_2 \quad (5)$$

In the expression (3), though the number of steps is calculated to be six steps, it is not limited to this, and the number of steps and the width of step can be arbitrarily set as the diaphragm stop which can be set. That is, more minute step or a rougher step may be applied.

In addition, the close-up shot is judged, when "$D_2 \geq TH_L$" is satisfied from the expression (4) and expression (5) for the lower bound threshold $TH_L$ in the dynamic range which can secure the flash light amount measurement accuracy as well as the above-mentioned embodiment. The system controller 16 calculates diaphragm stop $F_{cal}$ by the following expression (C) and expression (D) by using the acquisition data $D_2$ by the light emission in minimum aperture (preliminary light emission 2) for the close-up shot (step S17). Here, the GNmin in the expression (D) is defined by the guide number GNd with the minimum emission amount to obtain the emission amount to which the flash device is stable.

$$GNd = [(Dt - D_0 \times (F_2/F_0)^{-2})/(D_2 - D_0 \times (SS_2/SS_0) \times (F_2/F_0)^{-2})]^{1/2} \times GN_f \quad (C)$$

$$Fcal = (GNmin/GNd)^{-1} \times F_2 \quad (D)$$

The system controller 16 sets a value which is suitable to the obtained Fcal as the diaphragm stop Fx when the main light emission among the diaphragm stops, which can be set, of $F_1$, $F_A$, $F_B$, $F_C$, $F_D$, $F_E$, and $F_2$. And, the emission amount GNf is calculated by the expression (E) based on the Fx and is set to the emission amount $GN_x$ (step S18 and step S15).

$$GNf = (Fx/F_2) \times GNd \quad (E)$$

On the other hand, the data $D_1$ corresponding to the light emission in full aperture (preliminary light emission 1) is used in case of the normal photograph. The emission amount GNc is calculated by the expression (F), and is set to the emission amount $GN_x$ (step S16).

$$GNc = [(Dt - D_0 \times (F_1/F_0)^{-2})/(D_1 - D_0 \times (SS_1/SS_0) \times (F_1/F_0)^{-2})]^{1/2} \times GN_f \quad (F)$$

As mentioned above, the diaphragm stop at the open side is selected as much as possible among the diaphragm stops, which can be set, and the emission amount is determined according to the diaphragm stop. As a result, the reduction in energy by suppressing the emission amount of the flash device as much as possible, the decrease in the background light by narrowing it can be suppressed as much as possible, and the effect to improve the photograph performance can be achieved. It is desirable to perform the notification starting in step S14 described in FIG. 3B, though it is not especially described in the above-mentioned modification. In addition, the notification starting may be performed in any time before the main light emission and after step S13. Turning on the flag for the notification in step S14, for instance etc. may be executed, when the notification is started before the main light emission is executed.

Though the compensation is performed by the expression (E) to match a diaphragm stop to the settable diaphragm stop in the embodiment, of course, it is also possible to compensate it to the ISO sensitivity which can be set in place of the diaphragm stop. The compensation ISOc of the ISO sensitivity at the main light emission in this case is obtained by the following expression.

$$ISOc = (Fx/F_2)^2 \times ISO_2$$

As mentioned above, the compensation may be performed by the ISO sensitivity (i.e., gain), not the guide number (GN)

The following inventions can be extracted from the above-mentioned embodiments.

The camera apparatus, which performs a preliminary light emission before a main light emission for a photograph, according to the first aspect of the present invention is characterized by comprising: photoelectric conversion means for outputting a photoelectric conversion data which corresponds to an incident luminous flux through a photograph lens; preliminary light emission means for performing at least twice preliminary light emission of a first light emission which corresponds to the normal photographic region and a second preliminary light emission which corresponds to a close-up shot; data acquisition means for acquiring a photoelectric conversion data corresponding to the first preliminary light emission and the second preliminary light emission, respectively; judgment for judging whether it is a close-up shot or not based on the data obtained by the data acquisition means; and setting means for setting a light emission condition of the main light emission based on a judgment result of the judgment. Especially, the flash device control, which is automatically adaptable to the close-up shot, can be achieved without requiring the setting of the close-up shot mode at the close-up shot. That is, at the close-up shot, the flash amount control, which is automatically adaptable to the close-up shot at camera side, without requiring the user's operation for judging whether the user sets the close-up shot mode from the photograph distance. Therefore, since the load in the operation can be reduced especially at the close-up shot and the flash photography, a pleasant operation environment can be provided to the user. Moreover, by judging whether it is the close-up shot or not based on the photoelectric conversion data, the camera to which the close-up shot can be performed without requiring the special photograph mode can be provided in the close-up shot by an easy operation.

In the first aspect, the following modes are desirable. Each mode may be applied solely and may be applied by combining them.

(1) The acquisition means acquires the photoelectric conversion data in the state without light emission, and the setting means sets a diaphragm stop and a emission amount at the main light emission based on the each photoelectric conversion data obtained by the data acquisition means. The setting means selects a photoelectric conversion data to which an emission amount at the main light emission can be calculated among at least twice preliminary light emission, and sets a diaphragm stop, in which the selected photoelectric conversion data is obtained, at the preliminary light emission as a diaphragm value at the main light emission. A proper emission amount control can be performed in the main light emission.

(2) The preliminary light emission means sets a diaphragm stop at a second preliminary light emission to be narrower than a diaphragm stop at a first preliminary light emission.

(3) Notification means for notifying information according to the judgment when being judged that it is a close-up shot by the setting means is further provided.

(4) The setting means selects the diaphragm stop with a maximum aperture which can be set as a diaphragm stop at the main light emission. The photographer can confirm the close-up shot even when a special photograph mode is not prepared to the camera apparatus.

In addition, the use energy at the main light emission can be reduced as much as possible, and a necessary charge operation can be shortened at the flash light emission. As described above, the reduction in the background light can be suppressed as much as possible by setting the diaphragm on the open side as much as possible. The performance of photograph in the flash photography can be improved to the background in which the light emission does not reach the camera apparatus enough.

(5) The preliminary light emission means sets two or more the preliminary light emission which correspond to the close-up shot, and performs the set two or more preliminary light emission.

(6) The setting means sets a diaphragm stop to a diaphragm stop which is suitable to the diaphragm stop obtained by the light emission at the close-up shot among the diaphragm stops which can be set. Here, it is desirable that the setting means compensates the error for the set diaphragm stop and resets the emission amount.

The camera apparatus, which performs a preliminary light emission before a main light emission for a photograph, according to the second aspect of the present invention is characterized by comprising: a photoelectric conversion part which output a photoelectric conversion data which corresponds to an incident luminous flux through a photograph lens; a preliminary light emission part which performs at least twice preliminary light emission of a first light emission which corresponds to the normal photographic region and a second preliminary light emission which corresponds to a close-up shot; a data acquisition part which acquires a photoelectric conversion data corresponding to the first preliminary light emission and the second preliminary light emission, respectively; a judgment part which judges whether it is a close-up shot or not based on the data obtained by the data acquisition part; and a setting part which sets a light emission condition of the main light emission based on a judgment result of the judgment part.

The method of controlling a camera apparatus, which performs a preliminary light emission before a main light emission for a photograph, according to the third aspect of the present invention is characterized by comprising: outputting a photoelectric conversion data which corresponds to an incident luminous flux through a photograph lens; performing at least twice preliminary light emission of a first light emission which corresponds to the normal photographic region and a second preliminary light emission which corresponds to a close-up shot; acquiring a photoelectric conversion data corresponding to the first preliminary light emission and the second preliminary light emission, respectively; judging whether it is a close-up shot or not based on the acquired data; and setting a light emission condition of the main light emission based on the judgment result.

The program for controlling a camera apparatus, which performs a preliminary light emission before a main light emission for a photograph, according to the fourth aspect of the present invention is characterized by comprising: outputting a photoelectric conversion data which corresponds to an incident luminous flux through a photograph lens; performing at least twice preliminary light emission of a first light emission which corresponds to the normal photographic region and a second preliminary light emission which corresponds to a close-up shot; acquiring a photoelectric conversion data corresponding to the first preliminary light emission and the second preliminary light emission, respectively; judging whether it is a close-up shot or not based on the acquired data; and setting a light emission condition of the main light emission based on the judgment result.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A camera apparatus, which performs a preliminary light emission before a main light emission for a photograph, comprising:

photoelectric conversion means for outputting a photoelectric conversion data which corresponds to an incident luminous flux through a photograph lens;

preliminary light emission means for performing at least twice preliminary light emission of a first light emission which corresponds to the normal photographic region and a second preliminary light emission which corresponds to a close-up shot;

data acquisition means for acquiring a photoelectric conversion data corresponding to the first preliminary light emission and the second preliminary light emission, respectively;

judgment means for judging whether it is a close-up shot or not based on the data obtained by the data acquisition means; and setting means for setting a light emission condition of the main light emission based on a judgment result of the judgment.

2. The camera apparatus according to claim 1, wherein the acquisition means acquires the photoelectric conversion data in the state without light emission, and the setting means sets a diaphragm stop and a emission amount at the main light emission based on the each photoelectric conversion data obtained by the data acquisition means.

3. The camera apparatus according to claim 2, wherein the setting means selects a photoelectric conversion data to which an emission amount at the main light emission can be calculated among at least twice preliminary light emission, and sets a diaphragm stop, in which the selected photoelectric conversion data is obtained, at the preliminary light emission as a diaphragm value at the main light emission.

4. The camera apparatus according to claim 1, wherein the preliminary light emission means sets a diaphragm stop at a second preliminary light emission to be narrower than a diaphragm stop at a first preliminary light emission.

5. The camera apparatus according to claim 2, wherein the setting means selects the diaphragm stop with a maximum aperture which can be set as a diaphragm stop at the main light emission.

6. The camera apparatus according to claim 1, further comprising notification means for notifying information according to the judgment when being judged that it is a close-up shot by the setting means.

7. The camera apparatus according to claim 1, wherein the preliminary light emission means sets two or more the preliminary light emission which correspond to the close-up shot, and performs the set two or more preliminary light emission.

8. The camera apparatus according to claim 1, wherein the setting means sets a diaphragm stop to a diaphragm stop which is suitable to the diaphragm stop obtained by the light emission at the close-up shot among the diaphragm stops which can be set.

9. The camera apparatus according to claim 8, wherein the setting means compensates an error to the set diaphragm stop and resets the emission amount.

10. A camera apparatus, which performs a preliminary light emission before a main light emission for a photograph, comprising:

a photoelectric conversion part which output a photoelectric conversion data which corresponds to an incident luminous flux through a photograph lens;

a preliminary light emission part which performs at least twice preliminary light emission of a first light emission which corresponds to the normal photographic region and a second preliminary light emission which corresponds to a close-up shot;

a data acquisition part which acquires a photoelectric conversion data corresponding to the first preliminary light emission and the second preliminary light emission, respectively;

a judgment part which judges whether it is a close-up shot or not based on the data obtained by the data acquisition part; and a setting part which sets a light emission condition of the main light emission based on a judgment result of the judgment part.

11. A method of controlling a camera apparatus, which performs a preliminary light emission before a main light emission for a photograph, comprising:

outputting a photoelectric conversion data which corresponds to an incident luminous flux through a photograph lens;

performing at least twice preliminary light emission of a first light emission which corresponds to the normal photographic region and a second preliminary light emission which corresponds to a close-up shot;

acquiring a photoelectric conversion data corresponding to the first preliminary light emission and the second preliminary light emission, respectively;

judging whether it is a close-up shot or not based on the acquired data; and setting a light emission condition of the main light emission based on the judgment result.

12. A program for controlling a camera apparatus, which performs a preliminary light emission before a main light emission for a photograph, comprising:

outputting a photoelectric conversion data which corresponds to an incident luminous flux through a photograph lens;

performing at least twice preliminary light emission of a first light emission which corresponds to the normal photographic region and a second preliminary light emission which corresponds to a close-up shot;

acquiring a photoelectric conversion data corresponding to the first preliminary light emission and the second preliminary light emission, respectively;

judging whether it is a close-up shot or not based on the acquired data; and setting a light emission condition of the main light emission based on the judgment result.

* * * * *